Nov. 1, 1938. M. R. HULL ET AL 2,134,876

DUST SEAL FOR CRUSHING MACHINES

Filed Feb. 16, 1932 3 Sheets-Sheet 1

Inventors:
Monroe R. Hull,
Bayard S. Morrow,
William L. Casto,
By Byrnes, Townsend & Potter,
Attorneys.

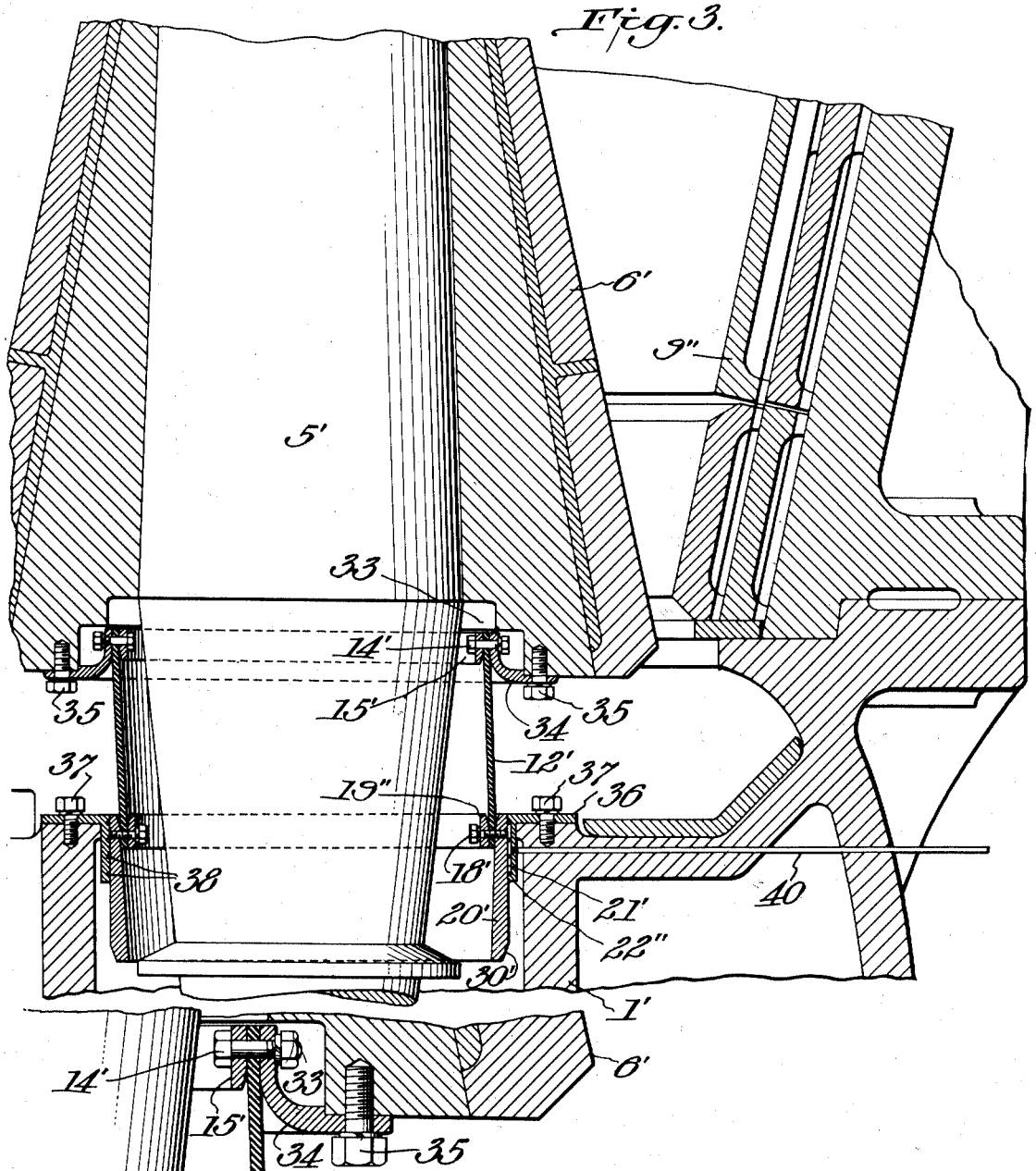

Nov. 1, 1938.   M. R. HULL ET AL   2,134,876
DUST SEAL FOR CRUSHING MACHINES
Filed Feb. 16, 1932   3 Sheets-Sheet 3

Patented Nov. 1, 1938

2,134,876

UNITED STATES PATENT OFFICE 2,134,876

DUST SEAL FOR CRUSHING MACHINES

Monroe R. Hull, Bayard S. Morrow, and William H. Casto, Anaconda, Mont., assignors to Allis-Chalmers Manufacturing Company, Milwaukee, Wis., a corporation of Delaware Application February 16, 1932, Serial No. 593,316

10 Claims. (Cl. 83—10)

In crushing and the like machines, such as are used for crushing ore and other rock-like materials, much abrasive dust and fine grit are produced during the crushing operation. This dust and grit are a cause of considerable wear and of expense incident to such wear in that they work their way into the bearings of the machines and into their moving parts and soon necessitate repairs and replacements.

In crushing machines of the gyratory type this is particularly true due to the large number of lubricated bearings and other parts with which the dust and grit may come in contact, and various dust seals, with which we are familiar, have been devised to overcome this difficulty.

A dust seal to be really effective in a so-called gyratory crushing machine must have certain characteristics demanded by the movement of the driven crusher member of the machine. This member, which is carried by a shaft arranged at a vertical angle in an eccentrically bored, rotatable bearing member journalled in the housing member of the machine and driven by a suitable gearing, has not only a gyratory motion which is imparted to it by this arrangement, but is often capable of axial adjustment and has a rotative movement with its shaft, commonly referred to as "drift".

Thus, a dust seal, to be practical, must be capable of accommodation not only to the gyratory motion of the driven crusher member but to this axial adjustment and rotation or "drift" as well, and hence it is impossible to fixedly attach the seal both to the driven crusher member and to the stationary housing member.

Where, in accordance with the prevalent practice, cooperating metal parts are used to provide a dust seal, these parts must have spherical contacting surfaces to accommodate them to the movement of the driven crusher member. The machining of such spherical surfaces is very expensive, and as they wear rapidly, due to the presence of the abrasive dust and grit, and must be replaced, their use greatly increases the cost of operation.

Moreover, those dust seals with which we are familiar are usually so constructed and assembled in the machine as to necessitate considerable dismantling of the machine for their replacement and/or repair, and this causes loss of time and increases operating expense.

One object of this invention is to provide a dust seal which not only may accommodate itself to all of the movements of the driven crusher member and still effectively prevent passage of dust and grit to the bearings and other lubricated moving parts, but one which may be easily and quickly assembled and disassembled without extensive dismantling of the machine, and which is formed of relatively inexpensive materials and parts, thus making replacement and/or repair proportionately cheap.

Another object of the invention is to provide a dust seal of such construction and arrangement that it may readily be designed for application to machines of known types or makes without necessitating radical changes in the machines themselves.

A further object of the invention is to provide a dust seal of such construction and arrangement that the use of articulating components having expensively machined spherical surfaces may be dispensed with, thereby providing a dust seal more suitable for the purpose at hand and more economical than the dust seals now used and with which we are familiar.

The invention contemplates a dust seal for crushing and the like machines which have a stationary member or housing and a crusher member capable of rotation, and/or gyration, the seal including a flexible apron annular or ring-like in form, one edge whereof is preferably fixedly attached to one of these members and the other edge of which is connected with the other member in such a manner as to be rotatable and axially slidable relatively thereto; and it contemplates, also, various details of construction and combinations of parts whereby assembly, disassembly and operation of the device are enhanced.

In the accompanying drawings illustrating the invention, in the several figures of which like parts are similarly designated—

Fig. 3 is a view similar to Fig. 1 but showing another known type of gyratory crusher with the dust seal of the invention applied thereto and embodying certain modifications of the seal illustrated in Figs. 1 and 2;

Fig. 4 is an enlarged fragmentary sectional view of the dust seal shown in Fig. 3 and illustrating, in detail, its mode of application.

Figures 1, 2:
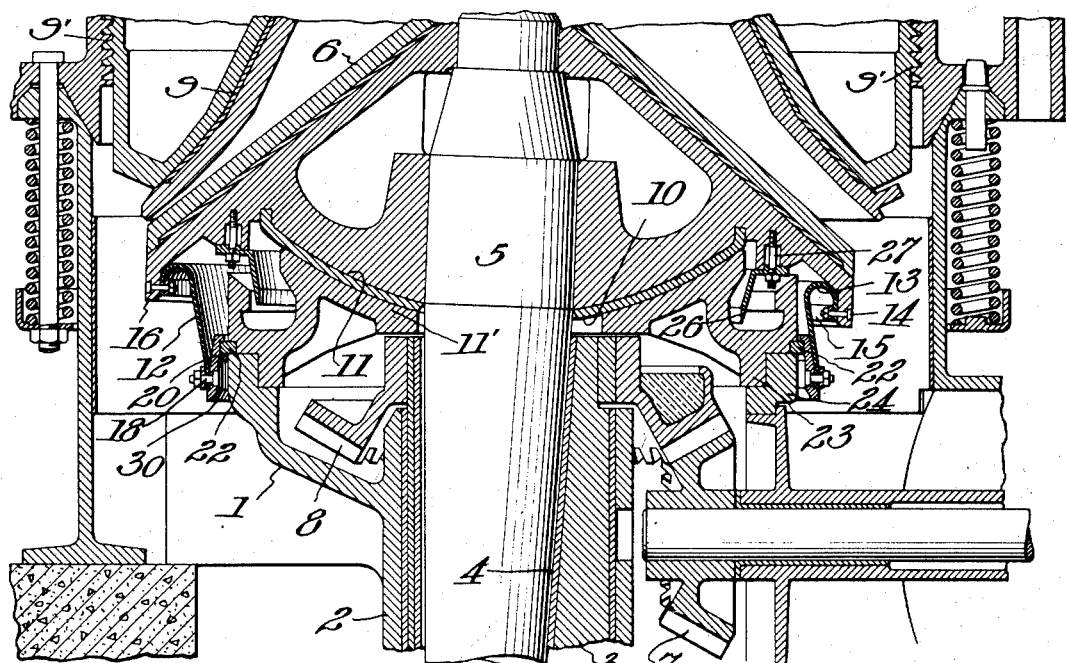
Fig. 1 is a fragmentary axial sectional elevation of a familiar type of gyratory crusher with a dust seal embodying the principles of the invention applied thereto.
Fig. 2 is an enlarged fragmentary sectional view of a portion of the dust seal illustrating, in detail, its mode of application to the machine of Fig. 1.

The crushing machine illustrated in Figs. 1 and 2 is of the type known as the "Symons cone crusher" and includes a stationary housing member 1 having a bearing 2 in which is rotatably mounted a journal member 3 eccentrically bored at 4 at an angle to the vertical to provide a bearing for the shaft 5 of the driven crusher member 6. The journal member 3 is driven in any suitable manner, as by the bevel pinion 7 and gear 8 to impart to the crusher member 6 a gyratory movement relatively to the fixed complemental crusher member 9. In order to provide against undue wear of the crusher member 6 its shaft 5 is so mounted in the journal member 3 that it and its shaft may rotate or "drift", and in order that the crushing action may be regulated to produce particles of desired size the crusher member 9 is adjustable relatively to the crusher member 6 by means of the screw threaded connection 9'.

The driven crusher member 6 has a spherical bearing surface 10 which seats upon a complemental bearing surface 11 of the socket member 11' which is supported on the housing member 1, and these bearing surfaces and others, and also the driving gearing 7—8 are suitably lubricated.

The dust seal of the invention is designed to prevent access of dust from the crushing members to these and other bearings and lubricated members.

Figure 5:
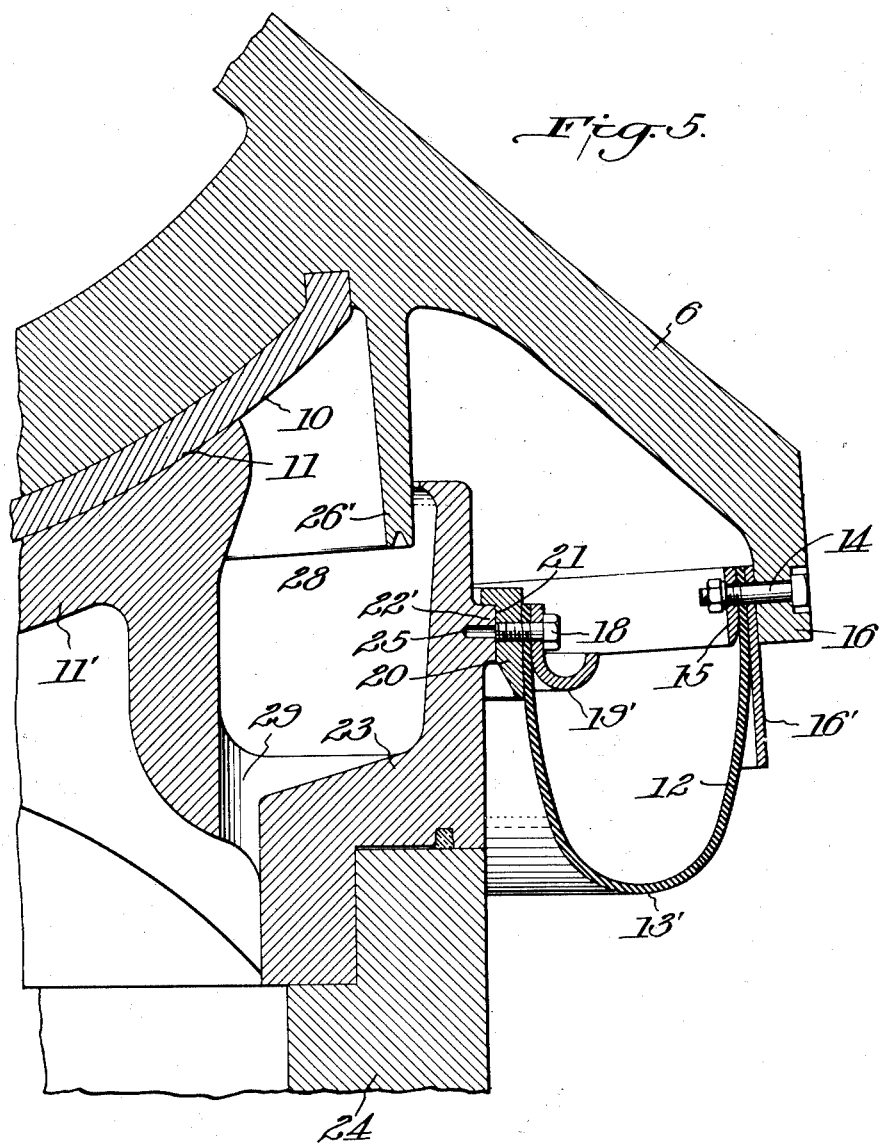
Fig. 5 is a view similar to Fig. 2, but illustrating a modified form of the dust seal of the invention.

As shown in Figs. 1, 2 and 5, this dust seal comprises an annular apron 12 formed of some suitable, flexible, impervious material capable of withstanding the combined movements of the crusher member 6 for a reasonable time without failure, such as rubber sheeting, rubberized woven or cord fabric, leather or the like, one edge of which is secured by a plurality of bolts 14 and a clamping ring 15, preferably formed in segments, to the depending flange 16 of the crusher member 6. The other edge of the apron is fastened by bolts 18 and a segmental clamping ring 19 to an annular sleeve 20 which has a rotative axially-slidable bearing at 21 upon a suitable bearing member carried by the housing 1. This bearing member may be a ring 22 secured between the members 23 and 24 of the housing 1, as shown in Figs. 1 and 2, or it may be an integral part 22' of member 23 suitably machined and finished as is depicted in Fig. 5. The ring form 22 is more particularly applicable for adapting our dust seal to existing "Symons cone crushers" which are basically constructed for the use of the multiple component seal of ordinary use, while the form depicted in Fig. 5 is more particularly applicable to "Symons cone crushers" the construction of which has been planned for the use of our dust seal. However, the ring form 22 is applicable in either case. A plurality of pockets or recesses 25 are provided in the parts 22 and 22' for the reception of lubricant to lubricate the bearing 21.

As will be apparent, the flexibility of the material of which the apron 12 is formed supplemented by its curved or looped cross sectional outline, as indicated at 13 and 13', Figs. 2 and 5, respectively, accommodates the dust seal to the gyratory movement of the crusher member 6, and the bearing 21 provides for rotation of the crusher member 6 relatively to the housing 1 and also for its axial movement for removal and replacement.

Clamping ring 19' is preferably of semi U-shape in cross section, as indicated, when applied to the construction depicted in Fig. 5, in order that the crusher member 6, with our dust seal permanently attached in the manner described, may be assembled and disassembled readily without undue injury to the flexible apron, the shape of the ring 19' providing a rolled edge to engage the loop of the apron.

An oil guard ring 26 secured by stud bolts 27 to the crusher member 6, as depicted in Figs. 1 and 2, or cast integral with crushing member 6, as depicted at 26' in Fig. 5 prevents escape of lubricant from the space 28 to the apron 12 and insures passage of such lubricant from the space 28 through ducts 29 into housing 1.

In order to protect the apron 12 from injury by particles of the material crushed, a guard member 16', Fig. 5, of suitable rigid or flexible material may be clamped between the apron and the flange 16. Thus, when the apron is formed of rubber-containing material it is guarded against the deleterious effects of lubricating oil.

It will be obvious to those familiar with the "Symons cone crusher" that the dust seal and oil guard ring of our invention are applied thereto without the necessity of changes in construction of the crusher parts to accommodate them.

To assemble the dust seal of Figs. 1 and 2, in the crushing machine it is only necessary to remove the members 9, 6 and 23 therefrom, apply the oil guard ring 26, apron 12 and sleeve 20 to the crusher member 6, and the bearing ring 22 between the housing parts 23 and 24, and then return the member 6 with the apron 12 and sleeve 20, as a unit, to the machine, care being taken to properly engage the sleeve 20 with the bearing ring 22. In order that this proper engagement may be facilitated, the sleeve is beveled as indicated at 30 and 31, and is provided with a flange 32 which normally seats upon the upper face of the bearing ring 22.

In order to make repairs and/or replacements of the parts of the dust seal, the apron 12 and sleeve 20 may be removed, as a unit, with the crusher member 6.

From the foregoing it is believed that the method of assembling and dismantling the modified form of seal shown in Fig. 5 will be apparent.

In Figs. 3 and 4 a typical gyratory crusher is illustrated, and the dust seal of the invention is so modified, in its details, although not in principle, as to adapt it to this general type of crushing machine.

In the machine illustrated, there is a stationary housing member 1' in which is arranged mechanism, not shown, for imparting gyratory movement to the shaft 5' which carries the driven crusher member 6' cooperating with the fixed crusher member 9'' and axially adjustable relatively thereto to determine the size of the crushed particles, as is customary in machines of this type.

The lower end of the crusher member 6' is recessed, as indicated at 33, in the manner usual in this type of machine, and in proximity to this recess, and preferably extending thereinto, is arranged a carrier ring 34 fixedly attached by cap screws 35 to the crusher member 6'.

The annular apron 12' of the form of dust seal here used is substantially cylindrical, and its upper edge is secured by bolts 14' and a segmental clamping ring 15' to the carrier ring 34. The lower edge of the apron is secured by bolts 18' and a segmental clamping ring 19'' to a sleeve 20' which has a rotative, axially-slidable bearing at 21' in a bearing ring 22'' secured by a flange 36 and cap screws 37 to the stationary housing member 1'.

The bearing ring 22" is provided with a plurality of annular grooves 38 which receive lubricant from one or more intersecting grooves 39 fed with lubricant by a pipe or pipes 40.

The leading or bottom outer edge of the sleeve 20 is beveled at 30' to facilitate its entrance into the bearing ring 22' during assembly of the parts, and the length of the sleeve 20' is such as to accommodate all normal axial adjustment of the crusher member 6'.

It will be understood that this form of the dust seal of the invention has all of the advantages of structure assembly and operation inherent in the forms illustrated in Figs. 1, 2 and 5 but is so modified thereover as to adapt it to the particular type of crushing machine shown without necessitating marked alteration of the machine itself.

In the forms of the invention illustrated in Figs. 1 to 4 the weight of the sleeve 20 or 20' is intended to be such as to maintain the apron 12 or 12' normally distended, and, in all of the forms shown, all of the connections, including the rotative axially-slidable bearings 21 and 21', are made dust-tight.

It will be apparent from the foregoing detailed description that the invention provides a simple, cheap, durable and effective dust seal which accommodates itself readily to all conditions of use and may easily be removed and replaced without extended dismantling of the machine.

Moreover, the metallic parts used, notably those providing the rotative axially-slidable bearings, are of simple form, easy to machine and assemble, and make unnecessary the employment of any of the expensive spherically formed parts heretofore commonly used.

Various changes are contemplated as within the spirit of the invention and the scope of the appended claims.

It is claimed and desired to secure by Letters Patent:

1. In crushing and the like machines including a stationary housing member and a crusher member capable of rotation and gyration relatively to said housing member, a dust seal including an annular apron attached to one of said members and having a rotative connection with the other member, said apron provided with a depending loop intermediate its point of attachment and connection with said members to provide a fullness to accommodate the gyration of said crusher member, and a guard member arranged exteriorly of said depending loop.

2. In crushing and the like machines including a stationary housing member and a crusher member capable of rotation and gyration relatively to said housing member, a dust seal including an annular apron attached to one of said members and having means including a sleeve and a clamping ring for attaching said apron to said sleeve to provide a rotative connection with the other member, said apron provided with a loop to accommodate the gyration of said crusher member, said clamping ring having a rolled edge to engage said loop.

3. In crushing and the like machines including a stationary member and a member capable of rotative and gyratory motion relatively thereto, a dust seal including a flexible apron having a fixed connection with the rotative gyratory member and having a rotative axially-slidable connection with the stationary member, a lubricant receiving well in said stationary member in open proximity to said apron and a guard member carried by said rotative gyratory member positioned between said well and said apron to prevent lubricant in said well from contacting with said apron.

4. Seal means for a gyratory crusher, comprising, in combination with the eccentric hub of the crusher and the gyratory crushing head, a composite dust excluding member, said member including annular members connected in fluid-tight manner, means clamping the composite member to the head, said crusher having a pipe extension mounted on the eccentric hub, said composite member being in surrounding engagement with said pipe extension, whereby the pipe extension closes the space between said hub and said composite member, said pipe extension having a grease inlet passage leading between the engaging surfaces of the pipe extension and the composite member.

5. Seal means for a gyratory crusher, comprising in combination with the eccentric hub of the crusher and the gyratory crushing head, a composite dust excluding member including annular members connected in fluid-tight manner, means clamping the composite member to the head, said crusher having an annular member mounted on the eccentric hub, said composite member being in surrounding engagement with said last named annular member, whereby the annular member closes the space between said hub and said composite member, said annular member having a grease inlet passage leading between the engaging surfaces of the annular member and the composite member.

6. In crushing and the like machines including a stationary member and a member capable of rotative and gyratory motion relatively thereto, a dust seal including a flexible apron having a fixed connection with the rotative gyratory member and having a rotative axially slidable connection with the stationary member, a lubricant receiving well in one of said members in open proximity to said apron and a guard member positioned between said well and said apron to prevent lubricant in said well from contacting with said apron.

7. Sealing means for a gyratory crusher, comprising in combination with the eccentric hub of the crusher and the gyratory crushing head, a composite dust excluding member including annular members connected in fluid-tight manner, means rigidly clamping the composite member to the head adjacent the periphery thereof, said crusher having an annular stationary member mounted in dust tight relation on the eccentric hub, said composite member being in surrounding bearing engagement with said last named annular member, whereby the annular member closes the space between said hub and said composite member.

8. In crushing and the like machines, a housing provided with a bearing and a gyratory crushing member capable of rotation and axially adjustable relatively to said housing, a stationary annular member surrounding said bearing in dust tight relation, a dust seal disposed between said stationary annular member and said gyratory crusher member, said seal including an annular apron of flexible material, means including a clamping ring for clamping one edge of said apron to said crushing member, a rigid sleeve mounted for axial and rotary sealing movement with respect to said stationary annular member, and a fluid tight connection between said annular apron and said sleeve.

9. In crushing and the like machine, a housing provided with a bearing and a gyratory crusher member capable of rotation and axially adjustable relatively to said housing, said member comprising a shaft and a conical crushing head provided with an annular depending skirt, a stationary annular member surrounding said member, a dust seal comprising a flexible annulus disposed between said conical head and said stationary member, one end of said dust seal being clamped to said annular depending skirt and the other end of said dust seal being in rotatable and sliding sealing relation with said annular member.

10. Sealing means for a gyratory crusher comprising a gyratory crusher head and a stationary eccentric hub, said sealing means comprising a composite annular shield rigidly clamped to the gyratory crushing head adjacent the periphery thereof, said shield including an annular rubber curtain and a rigid sleeve, said curtain and said sleeve being end connected in fluid tight manner and said sleeve axially slidably and rotatably sealing at its inner circumference directly around a fixed part of the crusher which is in dust tight relation with said eccentric hub.

MONROE R. HULL.
BAYARD S. MORROW.
WILLIAM H. CASTO.